United States Patent
Shin et al.

(10) Patent No.: US 8,312,391 B2
(45) Date of Patent: *Nov. 13, 2012

(54) TOUCH SCREEN DEVICE AND OPERATING METHOD THEREOF

(75) Inventors: Sang Hyun Shin, Seoul (KR); Ji Suk Chae, Seoul (KR); Ho Joo Park, Seoul (KR); Young Ho Ham, Yongin (KR); Jun Hee Kim, Seongnam (KR); Kyung Hee Yoo, Seoul (KR); Yu Mi Kim, Seongnam (KR)

(73) Assignee: LG Electronics Inc., Seoul (KR)

( * ) Notice: Subject to any disclaimer, the term of this patent is extended or adjusted under 35 U.S.C. 154(b) by 743 days.

This patent is subject to a terminal disclaimer.

(21) Appl. No.: 11/785,401

(22) Filed: Apr. 17, 2007

(65) Prior Publication Data

US 2007/0273666 A1 Nov. 29, 2007

Related U.S. Application Data

(63) Continuation of application No. 11/646,587, filed on Dec. 28, 2006.

(30) Foreign Application Priority Data

May 24, 2006 (KR) .......................... 10-2006-0046710

(51) Int. Cl.
G06F 15/00 (2006.01)
G06F 13/00 (2006.01)
(52) U.S. Cl. ........................................ 715/862; 715/788
(58) Field of Classification Search .................. 715/862, 715/835, 788, 787, 762–765
See application file for complete search history.

(56) References Cited

U.S. PATENT DOCUMENTS

| | | |
|---|---|---|
| 5,140,678 A | 8/1992 | Torres |
| 5,191,645 A | 3/1993 | Carlucci et al. |
| 5,495,566 A | 2/1996 | Kwatinetz |
| 5,523,775 A | 6/1996 | Capps |
| 5,526,011 A | 6/1996 | Hix et al. |
| 5,548,705 A | 8/1996 | Moran et al. |
| 5,559,944 A | 9/1996 | Ono |
| 5,570,113 A | 10/1996 | Zetts |
| 5,586,235 A | 12/1996 | Kauffman |
| 5,592,608 A | 1/1997 | Weber et al. |
| 5,596,699 A | 1/1997 | Driskell |

(Continued)

FOREIGN PATENT DOCUMENTS

AU 2006330724 7/2007

(Continued)

OTHER PUBLICATIONS

Indian Office Action dated Nov. 16, 2009.

(Continued)

*Primary Examiner* — Cao "Kevin" Nguyen
(74) *Attorney, Agent, or Firm* — KED & Associates, LLP

(57) ABSTRACT

A touch screen device and operating method thereof are provided. The touch screen device includes a screen including a display configured to display images thereon and a detector configured to detect a user touch and movement thereof, a storage device configured to store image information corresponding to the movement, and a controller configured to retrieve and display an image corresponding to the detected drag. The image may include at least one of a trace image representing a moving trajectory, an icon image, or a text image.

37 Claims, 10 Drawing Sheets

U.S. PATENT DOCUMENTS

| | | | |
|---|---|---|---|
| 5,757,368 A | 5/1998 | Gerpheide et al. | |
| 5,794,127 A | 8/1998 | Lansang | |
| 5,796,406 A | 8/1998 | Shigematsu et al. | |
| 5,821,936 A | 10/1998 | Shaffer et al. | |
| 5,831,616 A | 11/1998 | Lee | |
| 5,880,743 A | 3/1999 | Moran et al. | |
| 5,903,267 A | 5/1999 | Fisher | |
| 6,094,197 A | 7/2000 | Buxton et al. | |
| 6,097,387 A | 8/2000 | Sciammarella et al. | |
| 6,107,997 A | 8/2000 | Ure | |
| 6,121,960 A | 9/2000 | Carroll et al. | |
| 6,259,436 B1 | 7/2001 | Moon et al. | |
| 6,310,615 B1 | 10/2001 | Davis et al. | |
| 6,334,003 B1 | 12/2001 | Yokota | |
| 6,414,700 B1 | 7/2002 | Kurtenbach et al. | |
| 6,433,801 B1 | 8/2002 | Moon et al. | |
| 6,459,442 B1 | 10/2002 | Edwards et al. | |
| 6,476,796 B1 | 11/2002 | Kuzunuki et al. | |
| 6,525,749 B1 | 2/2003 | Moran et al. | |
| 6,560,281 B1 * | 5/2003 | Black et al. | 375/240 |
| 6,618,063 B1 | 9/2003 | Kurtenbach | |
| 6,724,370 B2 | 4/2004 | Dutta et al. | |
| 6,738,050 B2 | 5/2004 | Comiskey et al. | |
| 6,753,892 B2 | 6/2004 | Chung | |
| 6,765,557 B1 | 7/2004 | Segal et al. | |
| 6,883,140 B1 | 4/2005 | Acker et al. | |
| 6,883,145 B2 | 4/2005 | Jaeger | |
| 6,900,835 B2 | 5/2005 | Cazier et al. | |
| 6,915,492 B2 | 7/2005 | Kurtenbach et al. | |
| 6,940,494 B2 | 9/2005 | Hoshino et al. | |
| 6,957,395 B1 | 10/2005 | Jobs et al. | |
| 6,958,749 B1 | 10/2005 | Matsushita et al. | |
| 6,965,377 B2 | 11/2005 | Yanagisawa et al. | |
| 7,015,932 B1 | 3/2006 | Koike et al. | |
| 7,031,756 B1 | 4/2006 | Sim et al. | |
| 7,035,720 B2 | 4/2006 | Taxis | |
| 7,046,230 B2 | 5/2006 | Zadesky et al. | |
| 7,047,503 B1 | 5/2006 | Parrish et al. | |
| 7,158,913 B2 | 1/2007 | Park et al. | |
| 7,162,685 B2 | 1/2007 | Saito | |
| 7,164,410 B2 | 1/2007 | Kupka | |
| 7,164,432 B1 | 1/2007 | Amemiya | |
| 7,242,323 B2 | 7/2007 | Sato et al. | |
| 7,345,671 B2 | 3/2008 | Robbin et al. | |
| 7,348,967 B2 | 3/2008 | Zadesky et al. | |
| 7,406,666 B2 | 7/2008 | Davis et al. | |
| 7,434,177 B1 * | 10/2008 | Ording et al. | 715/862 |
| 7,456,823 B2 | 11/2008 | Poupyrev et al. | |
| 7,469,388 B1 | 12/2008 | Baudisch et al. | |
| 7,486,279 B2 | 2/2009 | Wong et al. | |
| 7,509,588 B2 * | 3/2009 | Van Os et al. | 715/835 |
| 7,898,529 B2 | 3/2011 | Fitzmaurice et al. | |
| 2001/0019374 A1 | 9/2001 | Izumi et al. | |
| 2002/0011990 A1 | 1/2002 | Anwar | |
| 2002/0015064 A1 | 2/2002 | Robotham et al. | |
| 2002/0103616 A1 | 8/2002 | Park et al. | |
| 2002/0149569 A1 | 10/2002 | Dutta et al. | |
| 2002/0149605 A1 | 10/2002 | Grossman | |
| 2002/0158920 A1 | 10/2002 | Abrams | |
| 2003/0076306 A1 | 4/2003 | Zadesky et al. | |
| 2003/0142123 A1 | 7/2003 | Malamud et al. | |
| 2003/0174149 A1 | 9/2003 | Fujisaki et al. | |
| 2003/0234772 A1 | 12/2003 | Zhang et al. | |
| 2004/0056839 A1 | 3/2004 | Yoshihara | |
| 2004/0095395 A1 | 5/2004 | Kurtenbach | |
| 2004/0100479 A1 | 5/2004 | Nakano et al. | |
| 2005/0024322 A1 | 2/2005 | Kupka | |
| 2005/0024341 A1 * | 2/2005 | Gillespie et al. | 345/173 |
| 2005/0047629 A1 | 3/2005 | Farrell et al. | |
| 2005/0176502 A1 | 8/2005 | Nishimura et al. | |
| 2005/0193017 A1 | 9/2005 | Kim | |
| 2005/0193351 A1 | 9/2005 | Huoviala | |
| 2005/0251748 A1 | 11/2005 | Gusmorino et al. | |
| 2006/0013079 A1 | 1/2006 | Rekimoto | |
| 2006/0026535 A1 | 2/2006 | Hotelling et al. | |
| 2006/0026536 A1 | 2/2006 | Hotelling et al. | |
| 2006/0085767 A1 | 4/2006 | Hinckley et al. | |
| 2006/0159279 A1 | 7/2006 | Kuo et al. | |
| 2006/0256091 A1 | 11/2006 | Hino | |
| 2006/0271947 A1 * | 11/2006 | Lienhart et al. | 725/19 |
| 2007/0018968 A1 | 1/2007 | Iwamoto et al. | |
| 2007/0030257 A1 | 2/2007 | Bhogal et al. | |
| 2007/0033539 A1 | 2/2007 | Thielman et al. | |
| 2007/0075980 A1 | 4/2007 | Hsieh et al. | |
| 2007/0125860 A1 | 6/2007 | Lapstun et al. | |
| 2007/0136690 A1 | 6/2007 | MacLaurin et al. | |
| 2007/0146544 A1 | 6/2007 | Liu et al. | |
| 2007/0150842 A1 | 6/2007 | Chaudhri et al. | |
| 2007/0180392 A1 | 8/2007 | Russo | |
| 2007/0273663 A1 | 11/2007 | Park et al. | |
| 2008/0150905 A1 | 6/2008 | Grivna et al. | |
| 2008/0282158 A1 | 11/2008 | Aaltonen et al. | |
| 2009/0119613 A1 | 5/2009 | Nakaya | |

FOREIGN PATENT DOCUMENTS

| | | |
|---|---|---|
| EP | 0604346 | 6/1994 |
| EP | 1 028 570 | 8/2000 |
| EP | 1 037 135 | 9/2000 |
| GB | 2329813 | 3/1999 |
| JP | 05-158616 | 6/1993 |
| JP | 2002041242 | 2/2002 |
| TW | 580636 | 3/2004 |
| TW | 580652 | 3/2004 |
| TW | 583552 | 4/2004 |
| TW | 200406734 | 5/2004 |
| TW | 200410853 | 7/2004 |
| TW | I236630 | 7/2005 |
| TW | M282290 | 12/2005 |
| WO | WO 00/38042 | 6/2000 |
| WO | WO 00/75766 | 12/2000 |
| WO | WO 2005/073954 | 8/2005 |

OTHER PUBLICATIONS

European Search Report for EP 07 10 0400 dated Oct. 20, 2010.
U.S. Office Action for U.S. Appl. No. 11/785,403 dated Jan. 7, 2010.
Final U.S. Office Action issued in U.S. Appl. No. 11/785,399 dated Nov. 16, 2010.
Final U.S. Office Action issued in U.S. Appl. No. 11/785,405 dated Nov. 22, 2010.
U.S. Office Action issued in U.S. Appl. No. 11/646,597 dated Dec. 21, 2010.
Supplemental Final U.S. Office Action issued in U.S. Appl. No. 11/785,399 dated Jan. 4, 2011.
U.S. Office Action issued in U.S. Appl. No. 11/646,613 dated Jan. 6, 2011.
U.S. Office Action issued in U.S. Appl. No. 11/646,585 dated Jan. 13, 2011.
Notice of Allowance issued in U.S. Appl. No. 11/646,598 dated Feb. 14, 2011.
Taiwan Office Action dated Jun. 8, 2010.
Taiwan Office Action dated Jun. 9, 2010.
U.S. Notice of Allowance U.S. Appl. No. 11/646,586 dated Jul. 13, 2010.
U.S. Office Action issued in U.S. Appl. No. 11/646,585 dated Jul. 21, 2011.
European Search Report dated Aug. 11, 2011. (07100272.9-1527).
U.S. Office Action issued in U.S. Appl. No. 11/785,404 dated Aug. 30, 2011.
U.S. Office Action issued in U.S. Appl. No. 12/363,379 dated Sep. 14, 2011.
U.S. Office Action U.S. Appl. No. 11/785,404 dated Sep. 1, 2010.
U.S. Office Action U.S. Appl. No. 11/646,585 dated Sep. 16, 2010.
Taiwan Office Action dated Aug. 27, 2010 (Application No. 095147944).
U.S. Office Action issued in U.S. Appl. No. 11/785,403 dated Oct. 25, 2010.
Office Action dated Nov. 13, 2009 for U.S. Appl. No. 11/646,613.
Office Action dated Nov. 13, 2009 for U.S. Appl. No. 11/785,405.
Office Action dated Oct. 20, 2009 for U.S. Appl. No. 11/646,604.
Office Action dated Sep. 18, 2009 for U.S. Appl. No. 11/646,586.
Office Action dated Nov. 3, 2009 for U.S. Appl. No. 11/785,402.
Office Action dated Nov. 13, 2009 for U.S. Appl. No. 11/646,587.

U.S. Office Action issued in U.S. Appl. No. 11/646,597 dated May 19, 2011.
U.S. Office Action issued in U.S. Appl. No. 11/785,405 dated Jun. 7, 2011.
U.S. Office Action issued in U.S. Appl. No. 11/785,403 dated Jun. 22, 2011.
U.S. Office Action issued in U.S. Appl. No. 11/785,404 dated Mar. 1, 2011.
U.S. Office Action issued in U.S. Appl. No. 11/646,613 dated Mar. 7, 2011.
U.S. Office Action issued in U.S. Appl. No. 11/785,399 dated Mar. 16, 2011.
Taiwanese Office Action issued in TW Application No. 095147947 dated Dec. 29, 2009 (translation).
U.S. Office Action issued in U.S. Appl. No. 11/785,400 dated Feb. 4, 2010.
U.S. Office Action issued in U.S. Appl. No. 11/646,598 dated Feb. 26, 2010.
U.S. Office Action issued in U.S. Appl. No. 11/646,613 dated Feb. 2, 2010, superceded by Office Action issued Mar. 8, 2010.
U.S. Office Action issued in U.S. Appl. No. 11/646,597 dated Mar. 8, 2010.
U.S. Office Action issued in U.S. Appl. No. 11/646,586 dated Mar. 10, 2010.
U.S. Office Action issued in U.S. Appl. No. 11/646,585 dated Mar. 18, 2010.
Andrew Sears and Ben Shneiderman Split menus: Effectively using selection frequency to organize menus ACM Transactions on Computer-Human Interaction, vol. 1, No. 1, Mar. 1994, pp. 27-51.
Article by Greg Scoblete, Sandisk Introduces Flash Drives, MP3 Players, TWICE, Jan. 20, 2006, 21, 3; Research Library, p. 4.
SanDisk Sana™ e200 User Guide.
U.S. Office Action issued in U.S. Appl. No. 11/785,404 dated Mar. 25, 2010.
Article by Greg Scoblete, Sandisk Introduces Flash Drives, MP3 Players, TWICE, Jan. 30, 2006, 21, 3; Research Library, p. 4.
U.S. Notice of Allowance issued in U.S. Appl. No. 11/785,402 dated Mar. 25, 2010.
U.S. Office Action issued in U.S. Appl. No. 11/785,399 dated Apr. 1, 2010.
U.S. Office Action issued in U.S. Appl. No. 11/785,403 dated May 12, 2010.
U.S. Office Action issued in U.S. Appl. No. 11/785,405 dated Jun. 4, 2010.
Indian Office Action dated May 14, 2010. (101/MUM/2007).
U.S. Office Action issued in U.S. Appl. No. 11/785,404 dated Apr. 11, 2012.
U.S. Office Action issued in U.S. Appl. No. 11/785,403 dated Dec. 21, 2011.
U.S. Notice of Allowance issued in U.S. Appl. No. 11/646,585 dated Dec. 28, 2011.
U.S. Office Action issued in U.S. Appl. No. 11/646,587 dated Jan. 6, 2012.
Taiwanese Office Action dated Jun. 15, 2010.
U.S. Office Action U.S. Appl. No. 11/646,598 dated Aug. 2, 2010.
U.S. Office Action U.S. Appl. No. 11/646,613 dated Aug. 4, 2010.

* cited by examiner

TOUCH SCREEN DEVICE AND OPERATING METHOD THEREOF

This is a Continuation application of Ser. No. 11/646,587 filed on Dec. 28, 2006, which claims priority to Application Serial No. 10-2006-10046710 filed on May 24, 2006 in Korea, which are incorporated herein by reference.

BACKGROUND

1. Field

A touch screen device and an operating method thereof are disclosed herein.

2. Background

Touch screen devices are applied to a variety of terminal devices to allow, for example, menus, operation status, or data in the form of pictures, characters, or images to be output. Recently, a variety of display devices, such as liquid crystal display (LCD) panels and plasma display panels (PDPs), have been developed in connection with a touch screen technology.

A touch screen device allows a user to click or drag a screen displayed thereon in a uniform pattern in order to receive commands. However, there is a problem in that unintended commands may be input if the user is not familiar with the pattern.

Further, a conventional touch screen device receives an input from a user to only execute the user input. Therefore, there is another problem in that the touch screen device cannot actively cope with the user input.

SUMMARY OF THE INVENTION

A touch screen device and operating method are provided according to embodiments disclosed herein.

BRIEF DESCRIPTION OF THE DRAWINGS

The above and other objects, features and advantages will become apparent from the following description of embodiments given in conjunction with the accompanying drawings, in which.

DETAILED DESCRIPTION

Hereinafter, embodiments of a touch screen device responding to a user input and an operating method thereof will be described in detail with reference to the accompanying drawings.

The touch screen device according to embodiments may be utilized with digital equipment, such as a MP3 player, a portable media player, a PDA, a portable terminal, a navigation system, and a notebook computer. Moreover, the touch screen device according to embodiments may be used with electronic books, newspapers, magazines, etc., different types of portable devices, for example, handsets, MP3 players, notebook computers, etc., audio applications, navigation applications, televisions, monitors, or other types of devices using a display, either monochrome or color. For convenience of explanation, an MP3 player will be described herein by way of example. Further, touch can include any type of direct or indirect touch or contact, using, for example, a finger or stylus.

Figure 1:
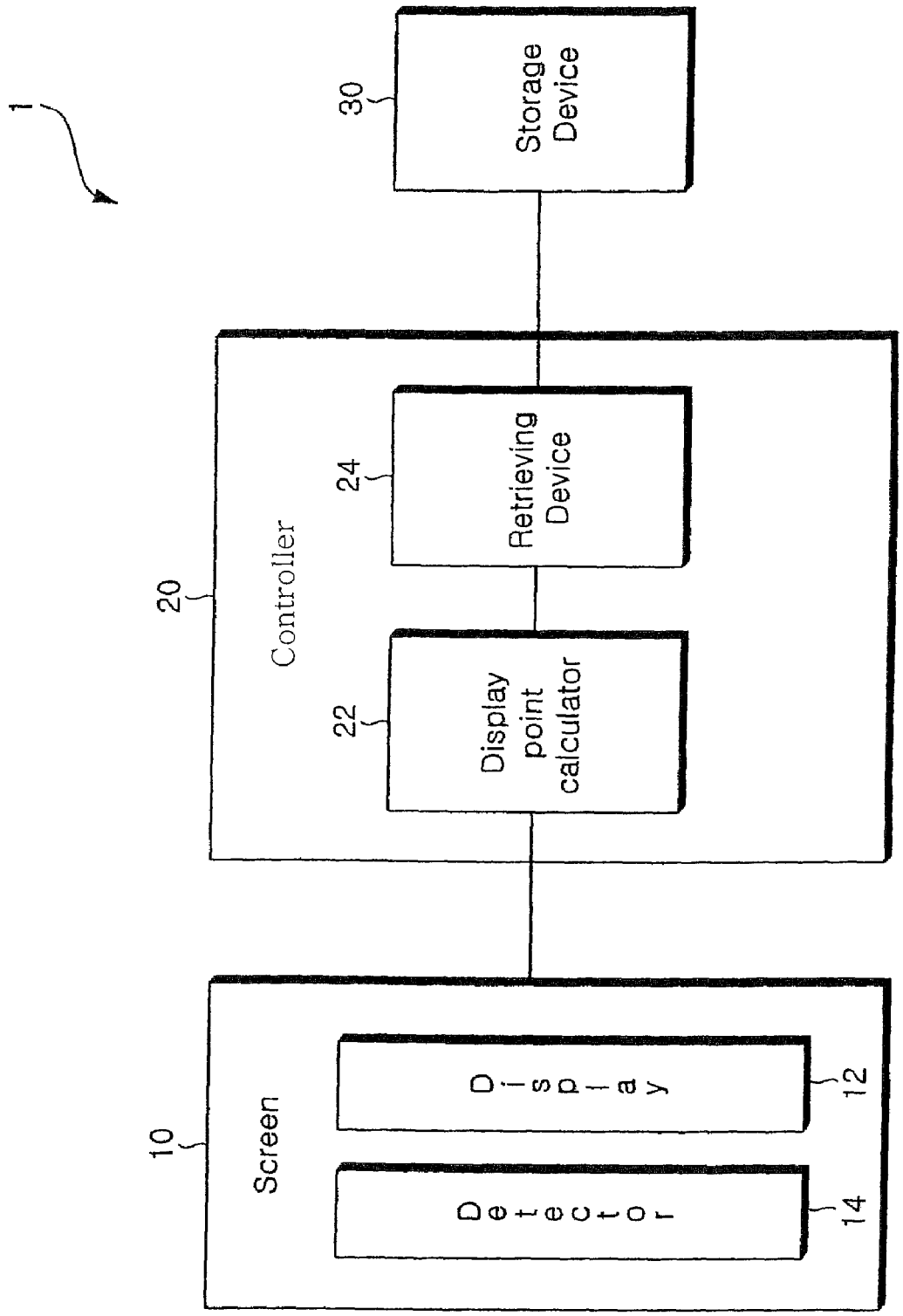
FIG. 1 is a block diagram of a touch screen device according to an embodiment.

FIG. 1 is a block diagram of a touch screen device according to an embodiment. As shown in FIG. 1, a touch screen device 1 according to an embodiment may comprise a screen 10 having a function of inputting and displaying information. The screen 10 may comprise a display 12 for displaying a plurality of menu information, such as icons and data thereon, and a detector 14 for detecting a touching action to select menus 40 or data displayed on the display 12. When the screen 10 is touched to select the menus 40 or data displayed on the screen 10 using, for example, a finger 60 or a stylus pen, the detector 14 may detect whether the screen 10 has been touched.

The display 12 may be a general screen display device, such as a liquid crystal display (LCD), a plasma display panel (PDP), a light emitting diode (LED), or an organic light emitting diode (OLED) can be used. In this embodiment, the detector 14 may be a thin layer provided on the front surface of the display 12, which employs a resistive or capacitive method; however, other touch screens, such as a touch screen that utilizes infrared rays may also be utilized.

In the case of the resistive touch screen, the touch screen may be configured in such a manner that two layers coated with resistive materials are provided and kept at a constant interval and electric currents are supplied to both the layers. If pressure is applied to a layer to come into contact with another layer, an amount of electric current flowing along the layers may be changed and a touch point thus detected by the change of electric current. In the case of a capacitive touch screen, the touch screen may be configured in such a manner that both surfaces of glass are coated with conductive metal and electric voltage applied to edges of the glass. In this embodiment, high frequencies flow along the surface of the touch screen and a high frequency waveform may be distorted when a finger is touched on the surface of the touch screen, and thus, a touch point detected by the change of the waveform.

The screen 10 may be connected to a controller 20 that controls an access command corresponding to the menu 40 selected according to the detection results of the detector 14 or data, such as additional information or messages to be described below, from a storage device 30, and thus, the display of the command or data onto the screen 10.

The controller 20 may control not only the aforementioned display 12, but also the overall operations of digital equipment. Further, the controller 20 may operate the digital equipment according to the detection results of the detector 30.

Meanwhile, according to one embodiment, the controller 20 may retrieve images such as icons or texts, in accordance with a drag and displays the images on a moving trajectory of the menu 40. The controller 20 may further comprise a display point calculator 22 and a retrieving device 24. The display point calculator 22 may calculate a point on the screen 10, on which a menu 40 is displayed, in accordance with a detection signal applied from the detector 14. In addition, the retrieving device 24 may retrieve images, such as icons or texts, which are previously assigned, in accordance with the selected menus touched, for example, by the finger 60 or stylus pen, among the menus 40 displayed on the screen 10, from the storage device 30.

Therefore, the controller 20 may display the image retrieved from the retrieving device 24 on the moving trajectory between a point calculated by the display point calculator 22 and a point where the menu 40 is selected. The displayed icon may be displayed in various ways, such as a single icon, a combination of a plurality of icons, or an iteration of the plurality of icons.

The controller 20 may be connected to the storage device 30 for providing images to the retrieving device 24. The storage device 30 may be provided with a hard disk or memory in which, for example, operation control methods, displaying methods, and/or images are stored. The images may include, for example, trace images 50*a*, icons, pictures, photographs and avatars, and words, sentences, or texts, which are previously assigned in accordance with the menus 40.

More particularly, the icons may be constructed in the form of a symbol or a small picture using, for examples, symbols, characters, figures, or graphics to represent the functions of various kinds of, for example, programs, commands, and data files, instead of characters. In other words, icons with special features may be displayed such that even users of different languages may use the functions.

Such icons have been recently developed in a variety of forms, such as emoticons or face marks. The emoticons may be constructed in a variety of forms, from a type using simple symbols to a type using complex graphics. Accordingly, in disclosed embodiments, the icons related to the menus 40 may be previously assigned and stored in the storage device 30.

Figure 2:
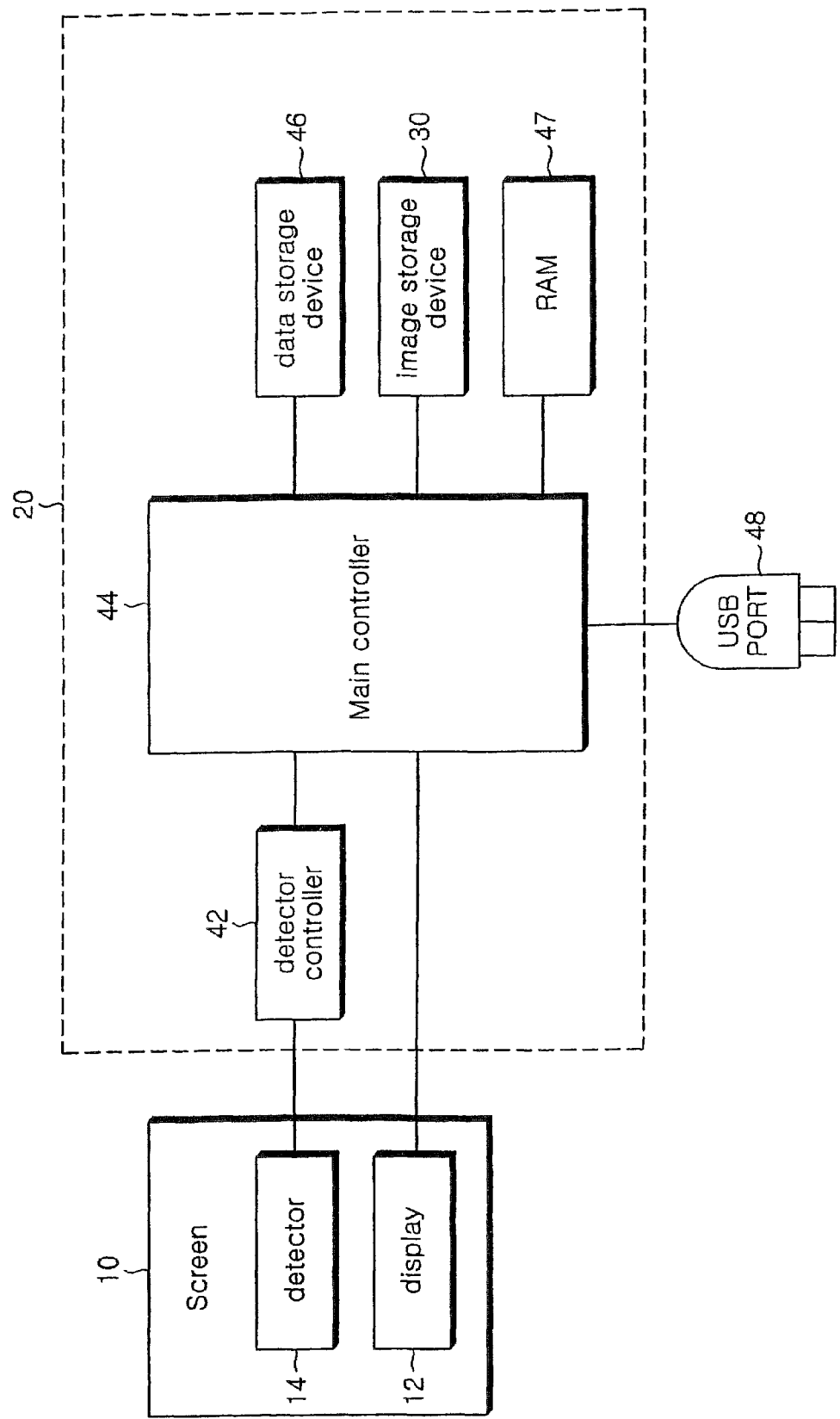
FIG. 2 is a block diagram of a touch screen device according to an embodiment.

In FIG. 2, a touch screen device according to an embodiment is described in more detail. As shown in FIG. 2, the screen 10 may comprises a touch screen or detector 14 and a display 12. In one embodiment, a thin film transistor liquid crystal display (TFT-LCD) may be used as the display 12.

The touch screen or detector 14 may be connected to a touch screen or detector controller 42 for signalizing a touch detected on the touch screen or detector 14. The display 12 and the touch screen or detector controller 42 may be connected to and operated under the control of the main controller 44. The main controller 44 may be configured such that a touch type may be detected by extracting the touch point and moving trajectory from digital signals input from the touch panel or detector controller 42, as described above.

Further, an image storage device 30 for storing information on images to be displayed by the touch may be connected to the main controller 44. The image information stored in the image image storage device 30 may be classified by the operation mode and contain an image corresponding to a specific touch. Further, the image storage device 30 may store voice information corresponding to the touch to transmit voice information simultaneously when an image is displayed.

Furthermore, a data image storage device 36 for storing, for example, MP3 files may be connected to the main controller 44. For example, a NAND memory capable of rapidly and easily storing and reading out a large amount of information may be used as the data image storage device 36.

A portion of the data image storage device 36 may be used as the image storage device 30. However, providing a separate image storage device 30 constructed of a NOR memory that is relatively superior in the stability of information may be advantageous.

In addition, a universal serial bus (USB) port 48 serving as an interface for modifying data may be connected to the main controller 44. The USB port 48 may be connected to an external device such that the image and voice information may be updated, deleted, or modified.

Moreover, the main controller 44 may be provided with a random access memory (RAM) 47 for driving the display device, for which a synchronous dynamic RANI (SDRAM) may be used.

Hereinafter, the operation of a touch screen device according to an embodiment will be described in detail.

Figure 3:
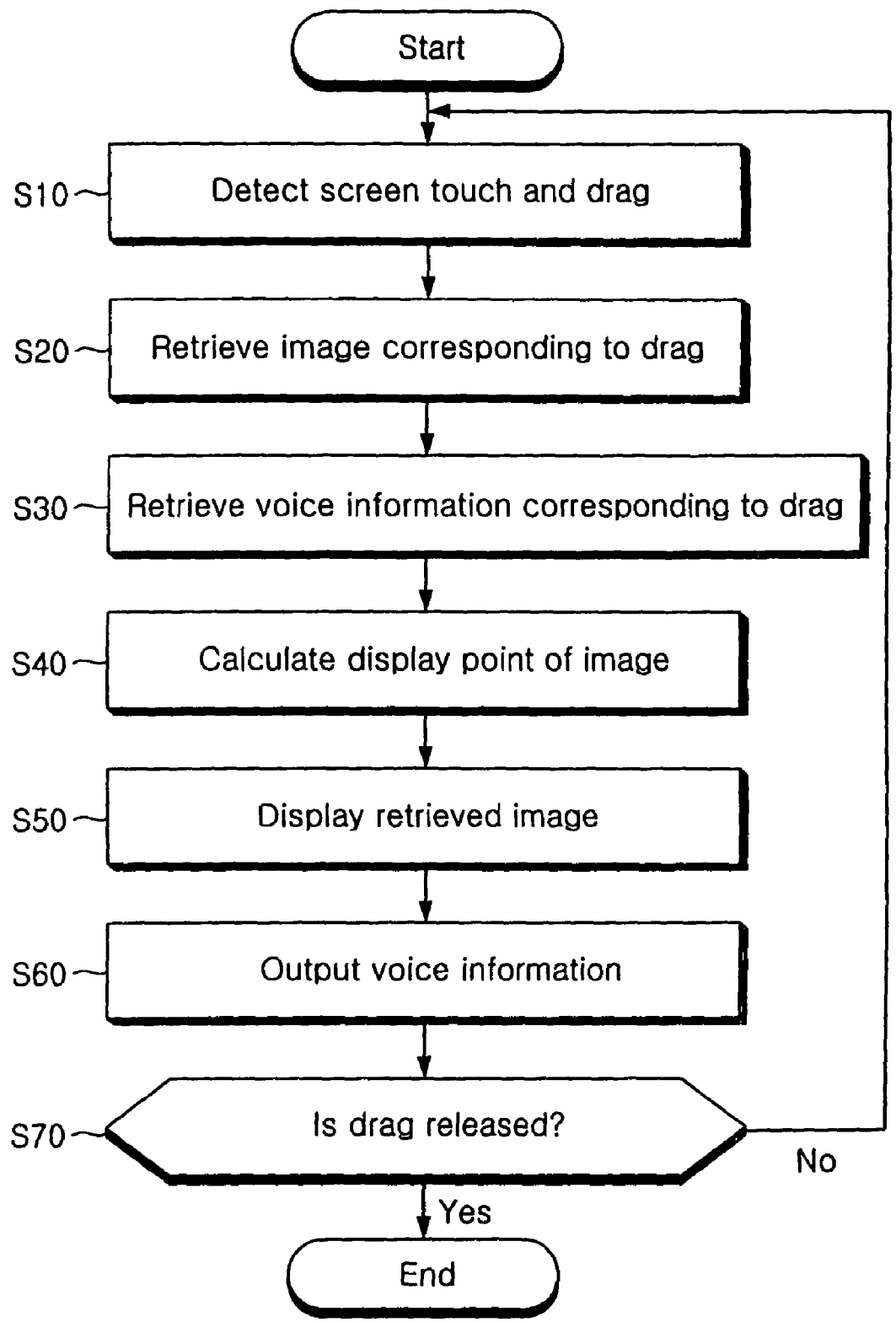
FIG. 3 is a flowchart of a method of operating a touch screen device according to an embodiment.

FIG. 3 is a flowchart of a method of operating a touch screen device according to an embodiment. As shown in FIG. 3, the operation of the touch screen device starts from detecting a touch or drag on the screen by the detector 14, in step S10.

If the detector 14 detects a touch on the screen 10, the retrieving device 24 in the controller 20 may identify a drag type and retrieve an image corresponding to the identified drag type from the image storage device 30, in step S20. The image may be, for example, a trace image 50*a* showing a drag trajectory, an icon image 50*b*, or a text image 50*c*.

The trace image 50*a* may be displayed along the drag trajectory. Further, the trace image may gradually fade away as a predetermined time period passes. Further, the retrieving device 24 may further retrieve voice information together with the image, in step S30. In this case, the voice information may be stored in the storage device 30. The retrieving device 24 may retrieve the voice information in accordance with the drag moving trajectory.

After retrieving the image, the display point calculator 22 may calculate a point where the image is displayed, in step S40. Thereafter, the controller 20 may display the image at the calculated point, in step S50. The image may include at least one of a trace image 50*a*, icon image 50*b*, or text image 50*c*.

At the same time, the controller 20 may output voice information, in step S60. That is, in certain embodiments, voice information may be selectively transmitted.

Next, the controller 20 may determine whether the drag is released, in step S70. The reason that it is determined whether the drag has been released is that the display of the image may be terminated if the drag has been released, or the display point or type of the image may be changed if the drag is maintained.

Hereinafter, operations of another embodiment will be described by way of example.

Figure 4A:
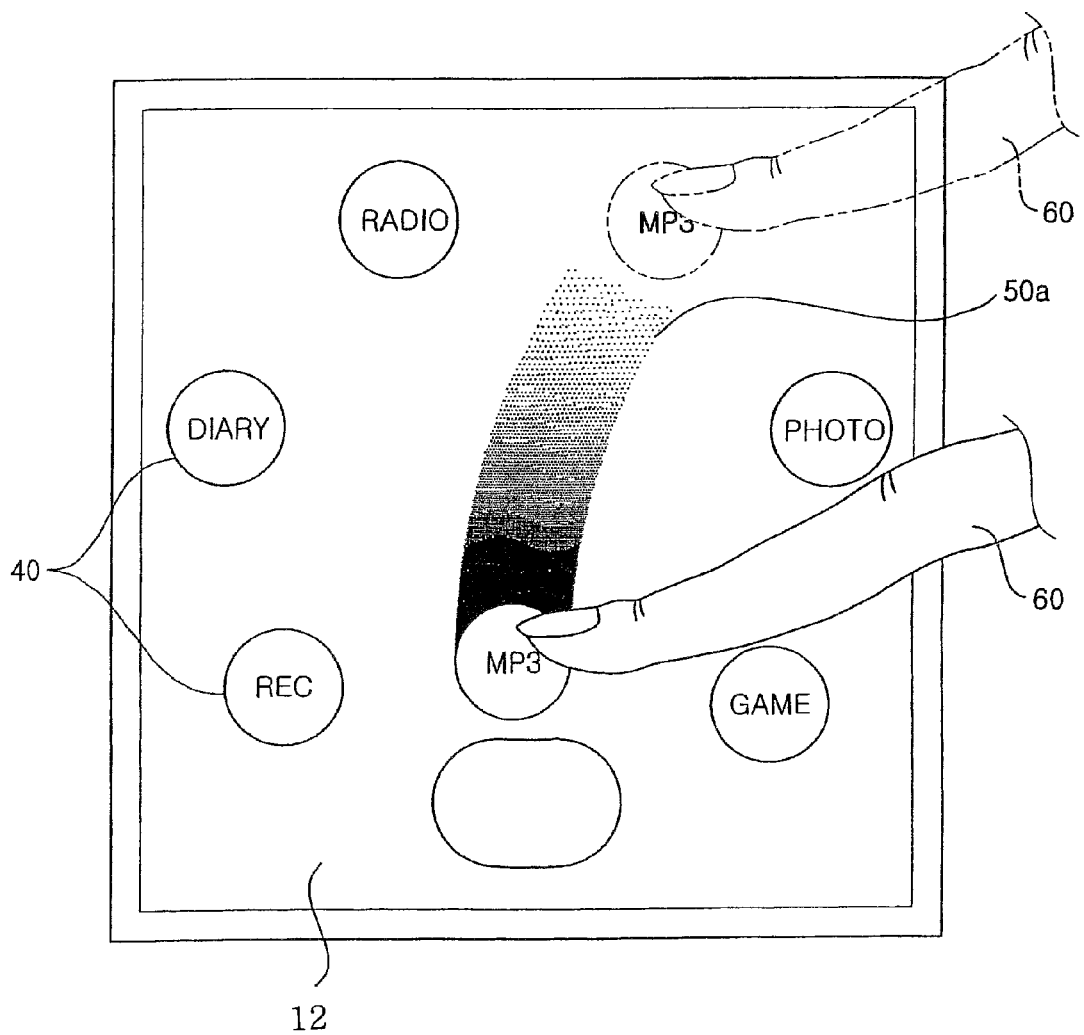
FIG. 4A is an exemplary view showing a trace image displayed on the touch screen device according to an embodiment.
Figure 4B:
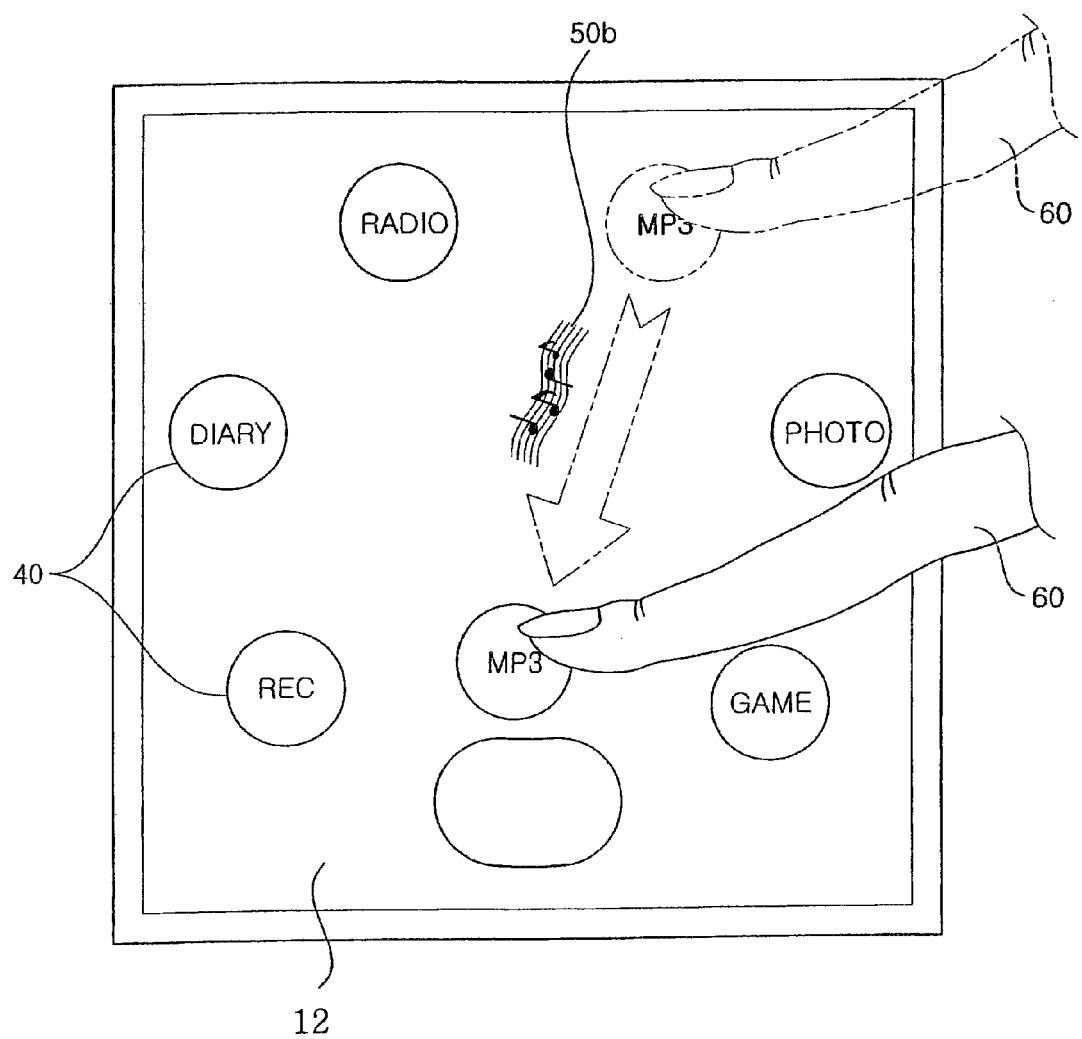
FIG. 4B is an exemplary view showing an icon image displayed on the touch screen device according to an embodiment.
Figure 4C:
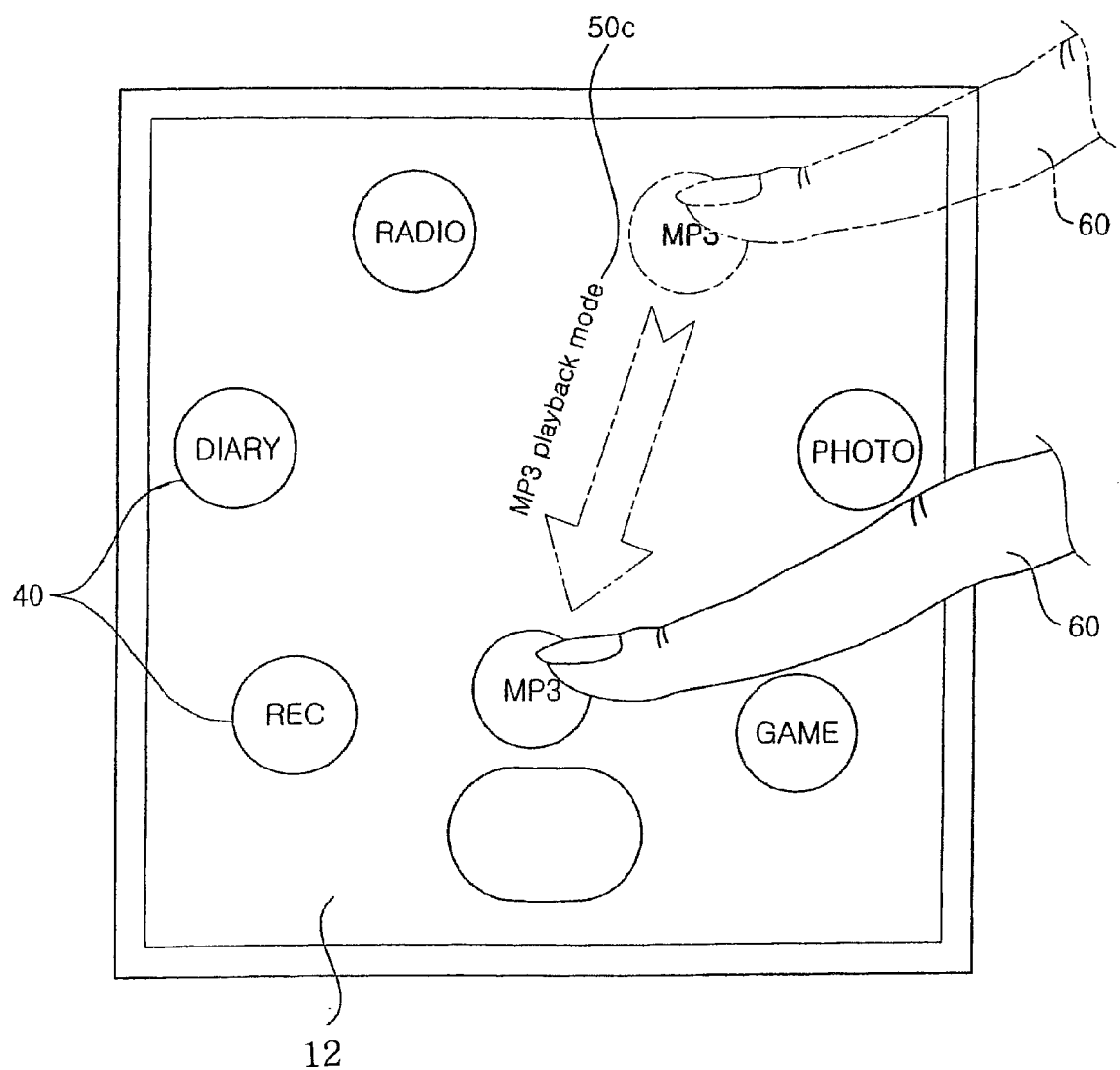
FIGS. 4C and 4D are exemplary views showing text images displayed on the touch screen device according to an embodiment.

FIG. 4A is an exemplary view showing a trace image displayed on a touch screen device according to an embodiment. FIG. 4B is an exemplary view showing an icon image displayed on a touch screen device according to an embodiment. FIG. 4C is an exemplary view showing a text image displayed on a touch screen device according to an embodiment.

As shown in FIG. 4A, if a finger 60 touches a desired menu 40 and drags the selected menu to a predetermined point in a menu selection mode, a trace image 50*a* may be displayed along the drag moving trajectory. In this example, the trace image 50*a* may gradually fade away as time passes. As shown in FIG. 4A, therefore, a more blurred trace image may be displayed as the trace image becomes farther away from the image of the menu 40.

On the other hand, FIG. 4B shows an icon image 50*b* displayed. There are a variety of icon images 50*b* which may be selected in accordance with the contents of the selected menus 40. That is, as shown in FIG. 4B, since a user has selected the "MP3" menu 40, an image indicating music may be displayed.

Alternatively, FIG. 4C shows a text image displayed. The text image 50c is may be descriptive of the selected menu 40. As shown in FIG. 4C, therefore, a text image 50c of "MP3 playback mode" describing the menu 40 may be displayed when the "MP3" menu 40 has been selected.

Figure 4D:
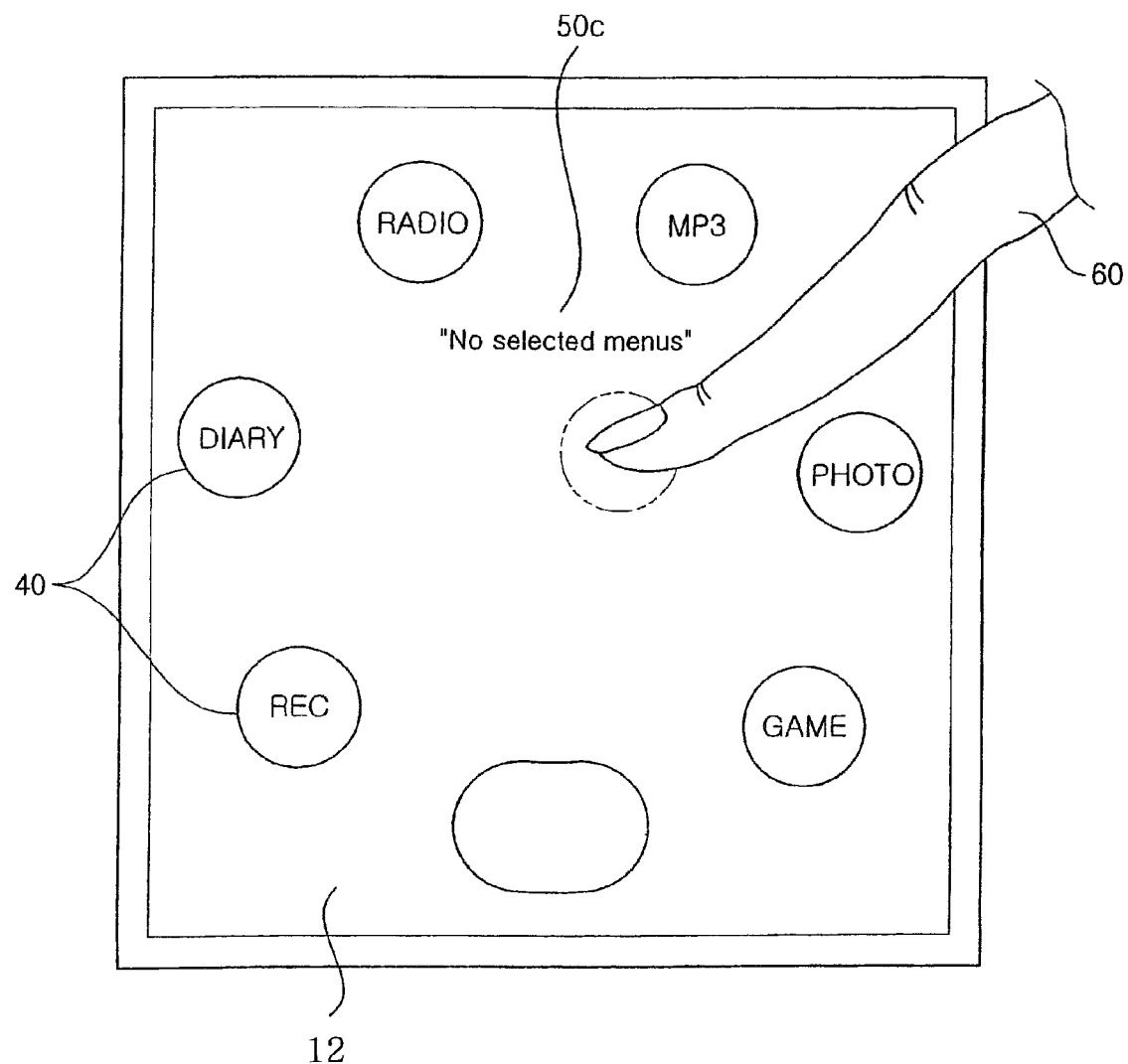

FIG. 4D shows a text image 50c displayed when no menu 40 is selected in the menu selection mode. As shown in FIG. 4D, when no menu 40 is selected, a text image 50c describing the above circumstance may be displayed. The text image 50c of "No selected menus" may be displayed by way of example, as shown in FIG. 4D.

Alternatively, an image may be displayed for a predetermined period of time and then the image may be changed. In one embodiment, the image may be changed based on a distance of the movement or drag.

FIGS. 4A to 4D show that embodiments are operated in a menu selection mode by way of example. However, the disclosed embodiments may be implemented in various modes of an MP3 player and may also be generally employed in digital equipment mounted with a touch screen device.

Figure 5A:
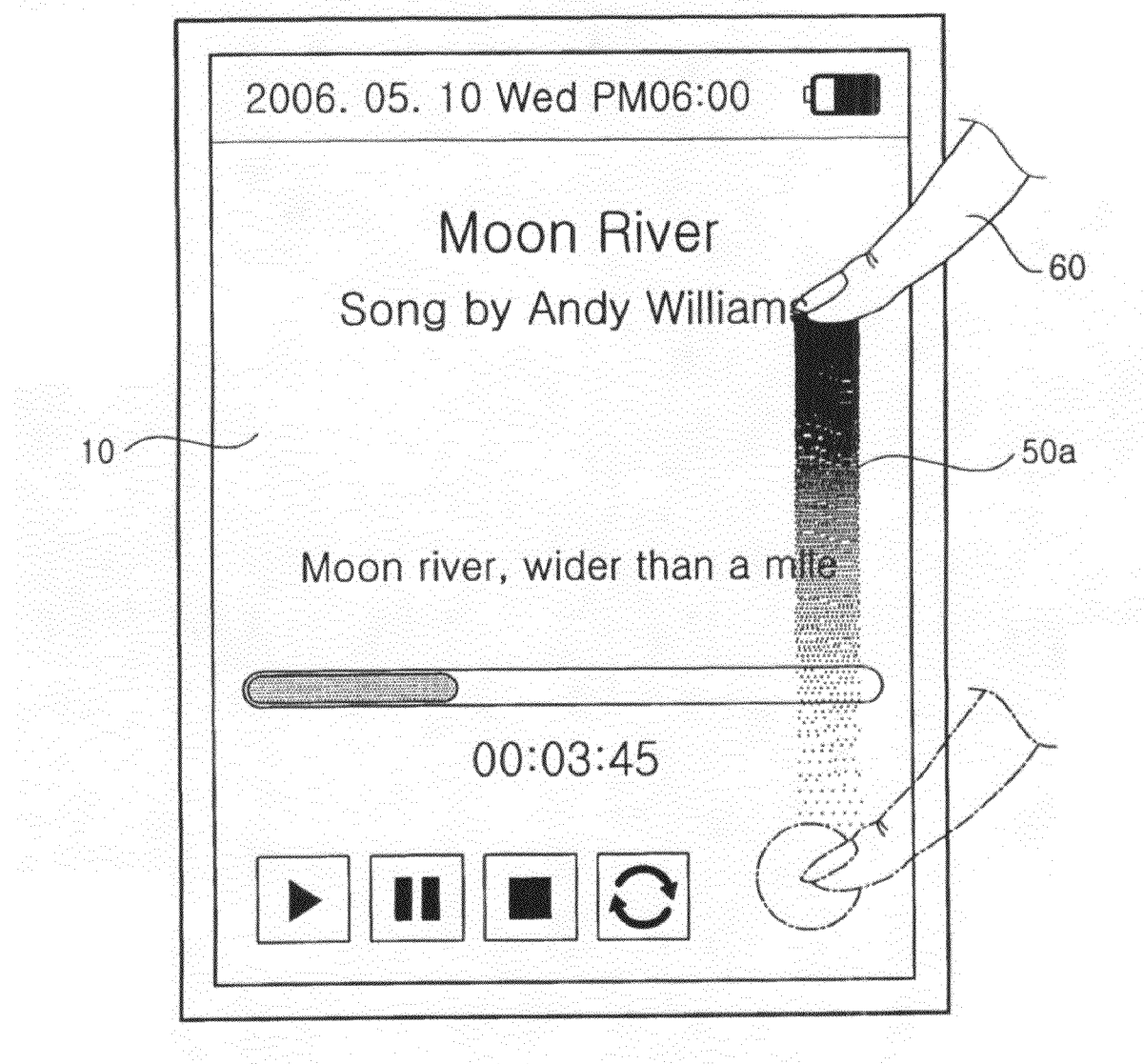
FIGS. 5A to 5C are exemplary views showing an embodiment operated in a playback mode of an exemplary MP3 player.
Figure 5B:
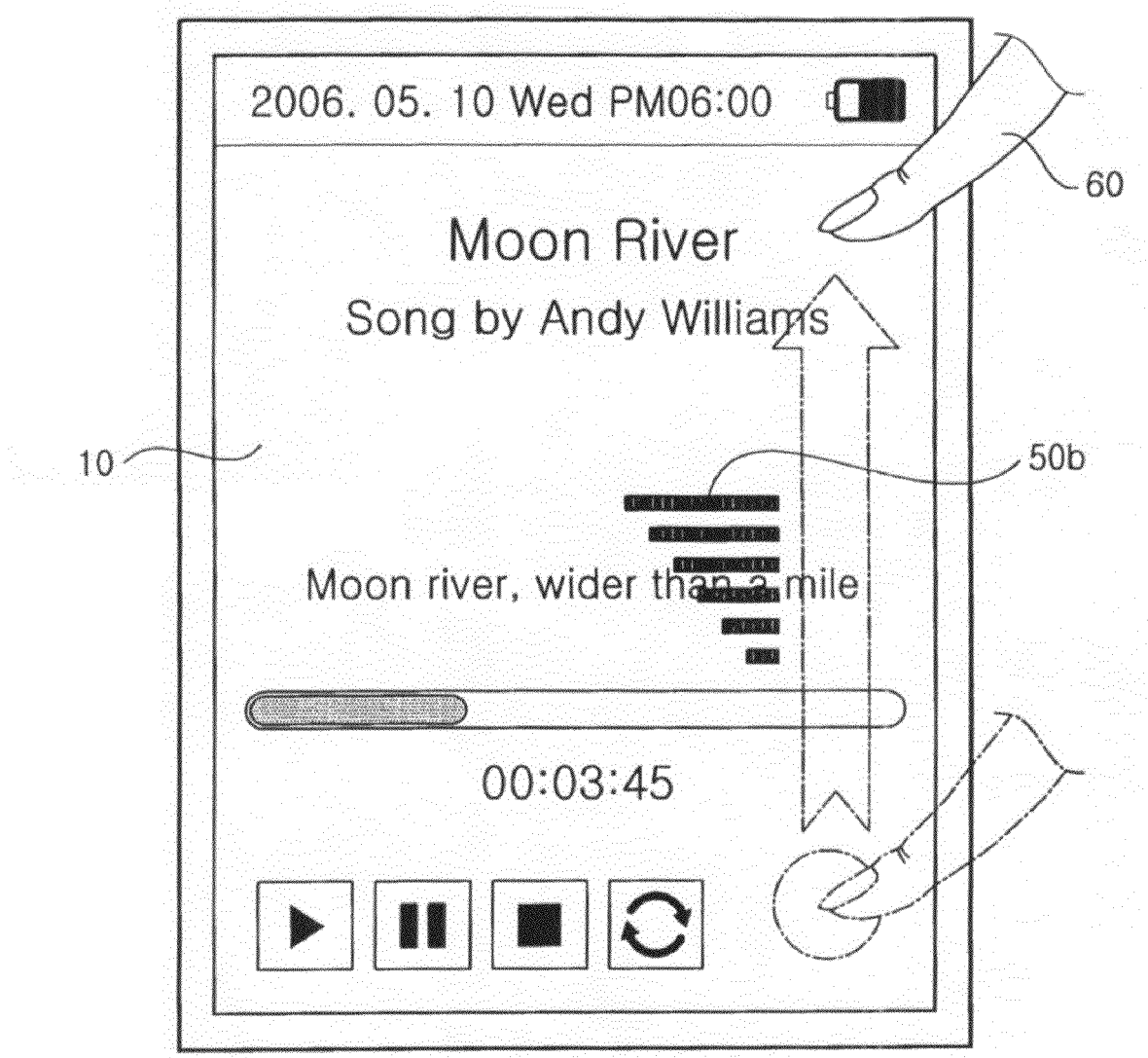
Figure 5C:
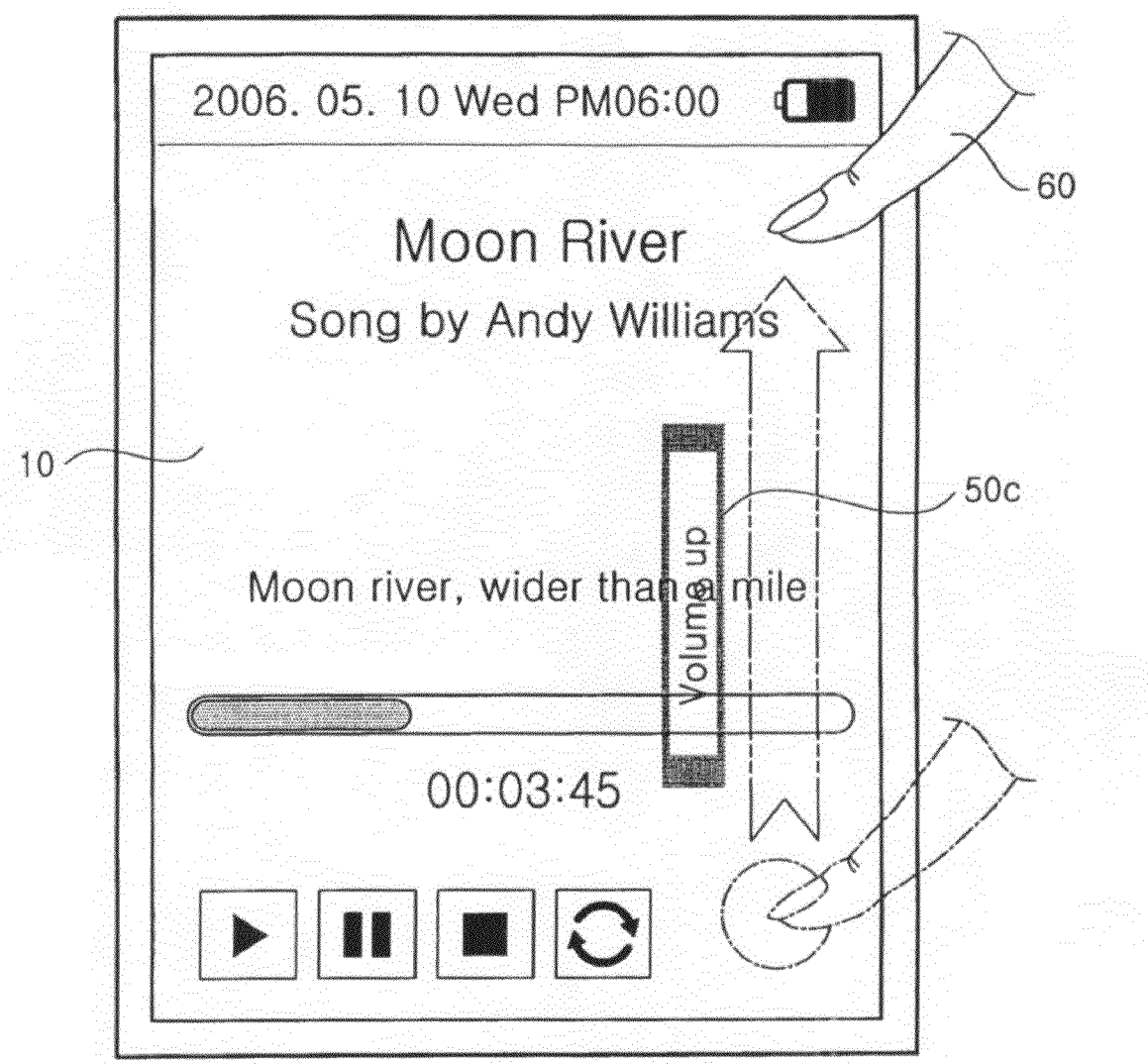

FIGS. 5A to 5C show an embodiment operated in a file playback mode of an MP3 player. In such a case, a user drag is shown as an example to correspond to a user command to turn up the volume of the MP3 player.

As shown in FIG. 5A, if a drag is executed corresponding to the volume-up in the playback mode, a trace image 50a may be displayed along the moving trajectory of the drag. In one embodiment, the trace image 50a may gradually fades away as time passes.

Further, an icon image 50b may be displayed as shown in FIG. 5B. There are a variety of icon images 50b which may be selected to be equivalent to the user command corresponding to the drag. That is, an image 50b depicting an increase of volume of the MP3 player may be displayed as shown in FIG. 5B.

In addition, FIG. 5C shows a text image 50c displayed. The text image 50c may be descriptive of a user command corresponding to the drag. Accordingly, a text image of "Volume Up" may be displayed in FIG. 5C.

According to another embodiment shown in F*ig*.5C, a user touches the screen 10 with a touching implement, such as, for example, a finger 60. Other touching implements, such as, for example, a stylus pen may also be appropriate. As shown in F*ig*. 5C, the user touches one side of the screen 10 and upwardly moves the touch. In this embodiment, when the screen 10 is touched or the touch point is changed on the screen 10, the controller 20 may detect the touch and the change of the touch point and select a relevant user command. After selecting the user command, the controller 20 may stand by until the user releases the touch. If the user does not release the touch even after a predetermined period of time has elapsed, the controller 20 may display additional information related to the user command indicated by the user's touch and the moving trajectory as shown in F*ig*. 5C. In this example, the type of drag corresponds to a user command to turn up the volume, and thus, the controller 20 may display a corresponding information image such as "Volume Up."

If the user releases the touch within the predetermined period of time, the controller 20 may simply execute the user command. However, before executing the user command, the controller 20 may examine whether the moving trajectory is a return trajectory and the touch release point is identical to the touch point. By returning to the original touch point, the user may cancel the user command. Therefore, if the user recognizes that an erroneous input has been made while performing the drag action on the detector 14, the user may merely return the drag trajectory to the initial touch point with the finger 60 still in contact with the detector 14, and then the user may release the touch. Therefore, when the moving trajectory is a return trajectory and the touch release point is essentially the same as the initial touch point, the controller 20 may not execute the user command. If the moving trajectory may not draw a return trajectory and the touch is normally released as described above, the controller 20 may execute the selected user command.

In a touch screen device and operating method thereof according to embodiments as described above in detail, at least the following advantages may be expected.

Since information corresponding to a user drag can be represented through a variety of images, a user can understand what kinds of operations the user performs during the touch screen manipulations. Thus, erroneous touch screen manipulations may be minimized.

In addition, when a user manipulates a touch screen device, the touch screen device may change display images in response to the user manipulations. Therefore, the user may enjoy visual pleasure and an intelligent interface responding to the user behaviors may be obtained.

Embodiments provide a touch screen device responding to a user input, wherein visual images such as icons or texts, which are previously assigned to a moving trajectory of a dragged menu, may be retrieved and displayed.

According to one embodiment broadly described herein, there is provided a touch screen device responding to a user input, including a screen unit including a display unit for displaying images thereon and a detection unit for detecting a user's touch and movement thereof (drag), an image storage unit for storing image information corresponding to the drag, and a control unit for retrieving and displaying an image corresponding to the detected drag. The control unit may include a retrieving unit for retrieving the image corresponding to the drag, and a display point calculating unit for calculating a point where the retrieved image is displayed. The image may be displayed to represent a trace of a moving trajectory of the drag.

The control unit may display the image for a predetermined period of time and cause the image to gradually fade away as time passes. Further, the image may be an icon or a combination of icons which is previously assigned in accordance with the drag. Also, the image may be a sentence or word which is previously assigned in accordance with the drag. Voice information corresponding to the drag may be stored in the image storage unit, and the control unit may display an image corresponding to the drag and simultaneously output the voice information.

According to another embodiment broadly described herein, there is provided a method of operating a touch screen device responding to a user input, including detecting a user's touch and movement thereof (drag), retrieving an image corresponding to the drag, and displaying the retrieved image. The method may further include retrieving voice information corresponding to the drag, and outputting the retrieved voice information.

The image may represent a trace of the drag. Also, the image may gradually fade away as time passes.

Further, the image may be an icon or a combination of icons which is previously assigned in accordance with the drag. In addition, the image may be a word or sentence which is previously assigned in accordance with the drag.

According to a further embodiment broadly disclosed herein, there is provided digital equipment mounted with a touch screen device which includes a screen unit including a display unit for displaying images thereon and a detection unit for detecting a user's touch and movement thereof (drag), an image storage unit for storing image information corresponding to the drag, and a control unit for retrieving and displaying an image corresponding to the detected drag. The image may represent a trace of a moving trajectory of the drag and gradually fade away as time passes.

With the disclosed embodiments, images displayed on the touch screen device may vary according to the user touch screen manipulations. Therefore, the user can easily identify input contents displayed on the touch screen device.

Embodiments broadly disclosed herein further provide a touch screen device, including a screen comprising a display configured to display images thereon and a detector configured to detect a touch and movement thereof, a storage device configured to store image information corresponding to the movement, and a controller configured to retrieve and display an image corresponding to the detected movement. The controller may include a retrieving device configured to retrieve the image corresponding to the movement, and a display point calculator configured to calculate a point where the retrieved image is displayed.

The image may be displayed to represent a trace of a moving trajectory of the movement. Further, the image may represent a drag.

Additionally, the controller may display the image for a predetermined period of time and cause the image to gradually fade away as time passes. Further, the controller may display the image for predetermined period of time and then change the image. The image may be changed based on a distance of the movement.

The image may be an icon or a combination of icons previously assigned in accordance with the movement. Further, the image may be a sentence or word previously assigned in accordance with the movement. Voice information corresponding to the movement may further be stored in the storage device, and the controller may display an image corresponding to the movement and simultaneously output the voice information.

Digital equipment may comprise the touch screen device. The digital equipment may include a MP3 player, a portable media player, a PDA, a portable terminal, a navigation system, or a notebook computer.

Embodiments broadly disclosed herein further provide a touch screen device, including a touch panel configured to detect a screen touch, a touch panel controller configured to signalize the touch detected on the touch panel and control the touch panel, a display configured to display images, an image image storage device configured to store an image corresponding to a touch detected on the touch panel, and a main controller configured to control operations of the touch panel controller and the display. The image storage device may further store voice information corresponding to the touch. The main controller may calculate a point and direction of the touch from a digital signal received from the touch panel controller. Further, the main controller may retrieve at least one of the image information and voice information corresponding to the point and direction of the touch from the image image storage device and execute the retrieved information according to the touch point and direction.

The image information and voice information may be classified by operation mode. The image storage device may be a NOR flash memory.

The device may further include a USB port connected to an external device configured to update or modify the image information and voice information stored in the image image storage device. Additionally, the device may include a data image storage device configured to store data of the touch screen device, and a RAM configured to drive the touch screen. A portion of the data image storage device may be configured into the image storage device.

The image may be an image displayed to represent a trace of a drag trajectory. The main controller may display the image for a predetermined period of time and cause the image to gradually fade away as time passes. Further, the controller may display the image for a period of time and then change the image. The image may be changed based on a distance of the movement.

The image may be an icon or a combination of icons which is previously assigned in accordance with a drag. Further, the image may be a sentence or word which is previously assigned in accordance with a drag. Also, the main controller may display an image corresponding to the touch and simultaneously transmit the voice information.

Embodiments broadly disclosed herein further provide a method of operating a touch screen device, including detecting a touch and movement thereof, retrieving an image corresponding to the movement, and displaying the retrieved image. The method may further include retrieving voice information corresponding to the movement, and outputting the retrieved voice information.

The image may represent a trace of the movement. The image may represent a drag.

The image may gradually fade away as time passes. The image may change after a predetermined period of time. The image may be changed based on a predetermined distance of movement.

The image may be an icon or a combination of icons previously assigned in accordance with the movement. The image may be a word or sentence previously assigned in accordance with the movement.

A method of operating digital equipment mounted with a touch screen device, may include the method. The digital equipment may include a MP3 player, a portable media player, a portable terminal, a navigation system, or a notebook computer.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the disclosure. In addition to variations and modifications in the component parts and/or arrangements, alternative uses will also be apparent to those skilled in the art.

What is claimed is:

1. A touch screen device, comprising: a screen comprising a display configured to display a menu thereon and a detector configured to detect a touch on the menu and movement thereof;
a storage device configured to store image information corresponding to the movement; and a controller configured to: retrieve an image corresponding to the detected movement, the image being at least one of a drag image, an icon, a combination of icons, or text, wherein the image is different from the menu; generate the retrieved image to be displayed along a moving trajectory of the movement together with the menu with which the touch is associated if the touch is maintained on the screen for a predetermined period of time; and
prevent the retrieved image from being displayed if the touch is released from the screen before the predetermined period of time elapses, wherein the controller is further configured to: calculate a direction of the movement of the touch detected by the detector, and
retrieve the image corresponding to the direction of the movement of the touch from the storage device to display the retrieved image according to the direction of the movement.

2. The device as claimed in claim 1, wherein the controller comprises:
a retrieving device configured to retrieve the image corresponding to the movement; and
a display point calculator configured to calculate a point where the retrieved image is displayed.

3. The device as claimed in claim 1, wherein the image is displayed to represent a trace of the moving trajectory of the movement.

4. The device as claimed in claim 3, wherein the image represents a drag.

5. The device as claimed in claim 1, wherein the controller causes the image to gradually fade away as time passes.

6. The device as claimed in claim 1, wherein the controller changes the image as time passes.

7. The device as claimed in claim 6, wherein the image is changed based on a distance of the movement.

8. The device as claimed in claim 1, wherein the image is an icon or a combination of icons previously assigned in accordance with the movement.

9. The device as claimed in claim 1, wherein the image is a sentence or word previously assigned in accordance with the movement.

10. The device as claimed in claim 1, wherein voice information corresponding to the movement is further stored in the storage device, and the controller displays the retrieved image corresponding to the movement and simultaneously outputs the voice information.

11. Digital equipment comprising the touch screen device of claim 1.

12. The digital equipment of claim 11, wherein the digital equipment comprises a MP3 player, a portable media player, a PDA, a portable terminal, a navigation system, or a notebook computer.

13. A touch screen device, comprising:
a touch panel configured to detect a touch drag regarding a menu;
a touch panel controller configured to signalize the touch drag detected on the touch panel and control the touch panel; a display configured to display images;
an image storage device configured to store an image corresponding to the touch drag detected on the touch panel; and a main controller configured to:
control operations of the touch panel controller and the display; retrieve an image corresponding to the detected touch drag, the image being at least one of a drag image, an icon, a combination of icons, or text, wherein the image is different from the menu; generate the retrieved image to be displayed along the touch drag together with the menu with which the touch drag is associated if a touch for the touch drag is maintained on the touch panel for a predetermined period of time; and
prevent the retrieved image from being displayed if the touch for the touch drag is released from the touch panel before the predetermined period of time elapses,
wherein the main controller is further configured to: calculate a direction of the touch drag from a digital signal received from the touch panel controller, and retrieve the image corresponding to the direction of the touch drag from the image storage device to display the retrieved image according to the direction of the touch drag.

14. The device as claimed in claim 13, wherein the image storage device further stores voice information corresponding to the touch drag.

15. The device as claimed in claim 13, wherein the image information [and voice information are] is classified by operation mode.

16. The device as claimed in claim 15, wherein the image storage device is a NOR flash memory.

17. The device as claimed in claim 16, further comprising:
a USB port connected to an external device configured to update or modify the image information and voice information stored in the image storage device.

18. The device as claimed in claim 17, further comprising:
a data image storage device configured to store data of the touch screen device; and
a RAM configured to drive the touch screen.

19. The device as claimed in claim 18, wherein a portion of the data image storage device is configured into the image storage device.

20. The device as claimed in claim 13, wherein the image is an image displayed to represent a trace of a drag trajectory.

21. The device as claimed in claim 13, wherein the main controller causes the image to gradually fade away as time passes.

22. The device as claimed in claim 13, wherein the main controller changes the image as time passes.

23. The device as claimed in claim 13, wherein the image is changed based on a distance of the touch drag.

24. The device as claimed in claim 13, wherein the image is an icon or a combination of icons which is previously assigned in accordance with the touch drag.

25. The device as claimed in claim 13, wherein the image is a sentence or word which is previously assigned in accordance with the touch drag.

26. The device as claimed in claim 13, wherein the main controller displays an image corresponding to the touch drag and simultaneously transmits the voice information.

27. A method of operating a touch screen device, the method comprising:
detecting a touch on a menu and movement thereof on a screen;
retrieving an image corresponding to the detected movement, the image being at least one of a drag image, an icon, a combination of icons, or text, wherein the image is different from the menu; generating the retrieved image to be displayed along a moving trajectory of the movement together with the menu with which the touch is associated if the touch is maintained on the screen for a predetermined period of time; and preventing the retrieved image from being displayed if the touch is released from the screen before the predetermined period of time elapses, wherein the method further comprises: calculating a direction of the detected movement of the touch, and retrieving the image corresponding to the direction of the movement to display the retrieved image according to the direction of the detected movement.

28. The method as claimed in claim 27, further comprising: retrieving voice information corresponding to the movement; and outputting the retrieved voice information.

29. The method as claimed in claim 27, wherein the image represents the trace of the movement.

30. The method as claimed in claim 29, wherein the image represents a drag.

31. The method as claimed in claim 29, wherein the image gradually fades away as time passes.

32. The method as claimed in claim 29, wherein the image is changed as time passes.

33. The method as claimed in claim 32, wherein the image is changed based on a distance of the movement.

34. The method as claimed in claim 27, wherein the image is an icon or a combination of icons previously assigned in accordance with the movement.

35. The method as claimed in claim 27, wherein the image is a word or sentence previously assigned in accordance with the movement.

36. A method of operating digital equipment mounted with a touch screen device, comprising the method of claim 27.

37. The method of claim 36, wherein the digital equipment comprises a MP3 player, a portable media player, a portable terminal, a navigation system, or a notebook computer.

\* \* \* \* \*